(12) United States Patent
Park et al.

(10) Patent No.: US 9,989,814 B2
(45) Date of Patent: Jun. 5, 2018

(54) LIQUID CRYSTAL DISPLAY

(71) Applicant: Samsung Display Co., Ltd., Yongin (KR)

(72) Inventors: Seung Hyun Park, Seoul (KR); Hyang Yul Kim, Hwaseong-si (KR); Ji Eun Lee, Seoul (KR); Soo Jeong Huh, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 196 days.

(21) Appl. No.: 14/715,043

(22) Filed: May 18, 2015

(65) Prior Publication Data

US 2016/0011476 A1    Jan. 14, 2016

(30) Foreign Application Priority Data

Jul. 10, 2014    (KR) .................. 10-2014-0086974

(51) Int. Cl.
*G02F 1/1343*    (2006.01)
*G02F 1/1337*    (2006.01)

(52) U.S. Cl.
CPC .. *G02F 1/134309* (2013.01); *G02F 1/134363* (2013.01); *G02F 2001/13373* (2013.01); *G02F 2001/134372* (2013.01)

(58) Field of Classification Search
CPC ............... G02F 2001/134372; G02F 1/134363
See application file for complete search history.

(56) References Cited

U.S. PATENT DOCUMENTS

| | | | |
|---|---|---|---|
| 7,009,673 B2 | 3/2006 | Matsumoto et al. | |
| 7,675,579 B2 | 3/2010 | Suzuki | |
| 8,149,367 B2 | 4/2012 | Tanno | |
| 8,436,972 B2 | 5/2013 | Arai et al. | |
| 2007/0252937 A1 | 11/2007 | Suzuki et al. | |
| 2010/0002162 A1* | 1/2010 | Morimoto | G02F 1/134363 349/38 |
| 2012/0127409 A1* | 5/2012 | Imayama | G02F 1/1368 349/133 |
| 2014/0152934 A1 | 6/2014 | Huh et al. | |

FOREIGN PATENT DOCUMENTS

| | | |
|---|---|---|
| KR | 1020040061981 | 7/2004 |
| KR | 1020120076936 | 7/2012 |

* cited by examiner

*Primary Examiner* — Wen-Ying P Chen
(74) *Attorney, Agent, or Firm* — Cantor Colburn LLP

(57) ABSTRACT

A liquid crystal display includes a first substrate, gate lines on the first substrate, a gate insulating layer on the gate lines, a semiconductor layer on the gate insulating layer, data lines and a drain electrode on the semiconductor layer, a passivation layer which covers the data lines and the drain electrode and in which a contact hole that partially exposes the drain electrode is defined, a common electrode above the passivation layer, a pixel electrode connected with the drain electrode through the contact hole, overlapped with the common electrode, and including a plurality of branch electrodes connected to each other through a connection portion, a contact portion extended from the connection portion and connected with the drain electrode, and a protrusion protruding toward a neighboring pixel and provided at least one corners among the connection portion or the contact portion of the pixel electrode.

15 Claims, 19 Drawing Sheets

LIQUID CRYSTAL DISPLAY

This application claims priority to Korean Patent Application No. 10-2014-0086974 filed on Jul. 10, 2014, and all the benefits accruing therefrom under 35 U.S.C. § 119, the entire contents of which are incorporated herein by reference.

BACKGROUND (a) Field

The invention relates to a liquid crystal display.

(b) Description of the Related Art

A liquid crystal display ("LCD") is one of the most common types of flat panel displays currently in use, and liquid crystal molecules of a liquid crystal layer in the LCD are rearranged by applying voltages to electrodes to control an amount of transmitted light.

The LCD has an advantage of facilitating a reduction in thickness, for example, but has a disadvantage that side visibility deteriorates compared with front visibility. In order to solve the disadvantage, various types of liquid crystal alignments and driving methods have been developed. As a method for implementing a wide viewing angle, an LCD in which a pixel electrode and a common electrode are disposed on one substrate has received attention.

In the case of the above described LCD, a plurality of cutouts is defined in at least one of two field generating electrodes of the pixel electrode and the common electrode, and a plurality of branch electrodes is defined by the plurality of cutouts. Liquid crystal molecules are arranged by an electric field generated between one electric field generation electrode having a plurality of branch electrodes and another electric field generation electrode having a planar plate shape such that an amount of transmissive light is controlled.

SUMMARY

The invention has been made in an effort to provide a display device that can suppress a reverse directional alignment of liquid crystals by providing a protrusion at an edge of a pixel electrode and solving a problem of occurrence of white bruising.

An LCD according to an exemplary embodiment of the invention includes a first substrate, gate lines disposed on the first substrate, a gate insulating layer disposed on the gate lines, a semiconductor layer disposed on the gate insulating layer, data lines and a drain electrode disposed on the semiconductor layer, a passivation layer covering the data lines and the drain electrode and including a contact hole that partially exposes the drain electrode, a common electrode provided above the passivation layer, a pixel electrode electrically connected with the drain electrode through the contact hole and being overlapped with the common electrode, and a second substrate corresponding to the first substrate, where the pixel electrode includes a plurality of branch electrodes, the plurality of branch electrodes are respectively connected through a connection portion from upper portions and lower portions thereof, the pixel electrode includes a contact portion extended from the connection portion or the branch electrode, the contact portion is electrically connected with the drain electrode through the contact hole, and a protrusion protruding toward a neighboring pixel is provided at one or more corners among the connection portion or the contact portion of the pixel electrode.

In an exemplary embodiment, the protrusion may be provided by being extended from the pixel branch electrode and may be provided in the same plane as the branch electrode.

In an exemplary embodiment, a width of the protrusion may be gradually decreased toward an end thereof.

In an exemplary embodiment, the protrusion may be provided in the shape of a triangle.

In an exemplary embodiment, the protrusion may be provided in the top end of the rightmost branch electrode of the pixel electrode.

In an exemplary embodiment, the protrusion may be provided in the top end of at least one branch electrode of the pixel electrode.

In an exemplary embodiment, the protrusion and the gate line may define an angle of about 0 degree to about 90 degrees.

In an exemplary embodiment, the protrusion may be provided in the lower end of the rightmost branch electrode of the pixel electrode.

In an exemplary embodiment, the protrusion and the gate line may define an angle of about 0 degree to about 90 degrees In an exemplary embodiment, the protrusion may be provided in one corner of a contact area where the pixel electrode contacts the drain electrode.

In an exemplary embodiment, the protrusion and the gate line may define an angle of about 0 degree to about 90 degrees.

An LCD according to an exemplary embodiment of the invention includes a first substrate, gate lines disposed on the first substrate, a gate insulating layer disposed on the gate line, a semiconductor layer disposed on the gate insulating layer, data lines and a drain electrode disposed on the semiconductor layer, a passivation layer covering the data lines and the drain electrode and including a contact hole that partially exposes the drain electrode, a common electrode provided above the passivation layer, a pixel electrode electrically connected with the drain electrode through the contact hole and being overlapped with the common electrode, and a second substrate corresponding to the first substrate, where the pixel electrode includes a plurality of branch electrodes, the plurality of branch electrodes are connected at lower portions thereof and upper portions thereof are separated from each other, thereby providing a fork shape, the pixel electrode includes a contact portion extended from the connection portion or the branch electrode, the contact portion is electrically connected with the drain electrode through the contact hole, and a protrusion protruding toward a neighboring pixel is provided in the end of at least one of the connection portion, the upper branch electrode, or the contact portion of the pixel electrode.

In an exemplary embodiment, the protrusion may be provided in at least one place of the top end of at least one branch electrode of the pixel electrode, the right lower end of the branch electrode of the pixel electrode, and one corner of a contact area where the pixel electrode contacts the drain electrode.

In an exemplary embodiment, the protrusion and the gate line may define an angle of about 0 degree to about 90 degrees.

In an exemplary embodiment, a width of the protrusion may be gradually decreased toward an end thereof.

In an exemplary embodiment, the protrusion may be provided in the shape of a triangle.

Liquid crystals in an area where the protrusion may be arranged in a direction that is the same as the direction in which liquid crystals of a peripheral area are arranged.

As described, in the display device according to the exemplary embodiment of the invention, a protrusion is provided at an end of a pixel electrode of the device to suppress a reverse directional alignment of liquid crystals occurring at a boundary portion of the pixel electrodes and drive the LCD with a higher voltage.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
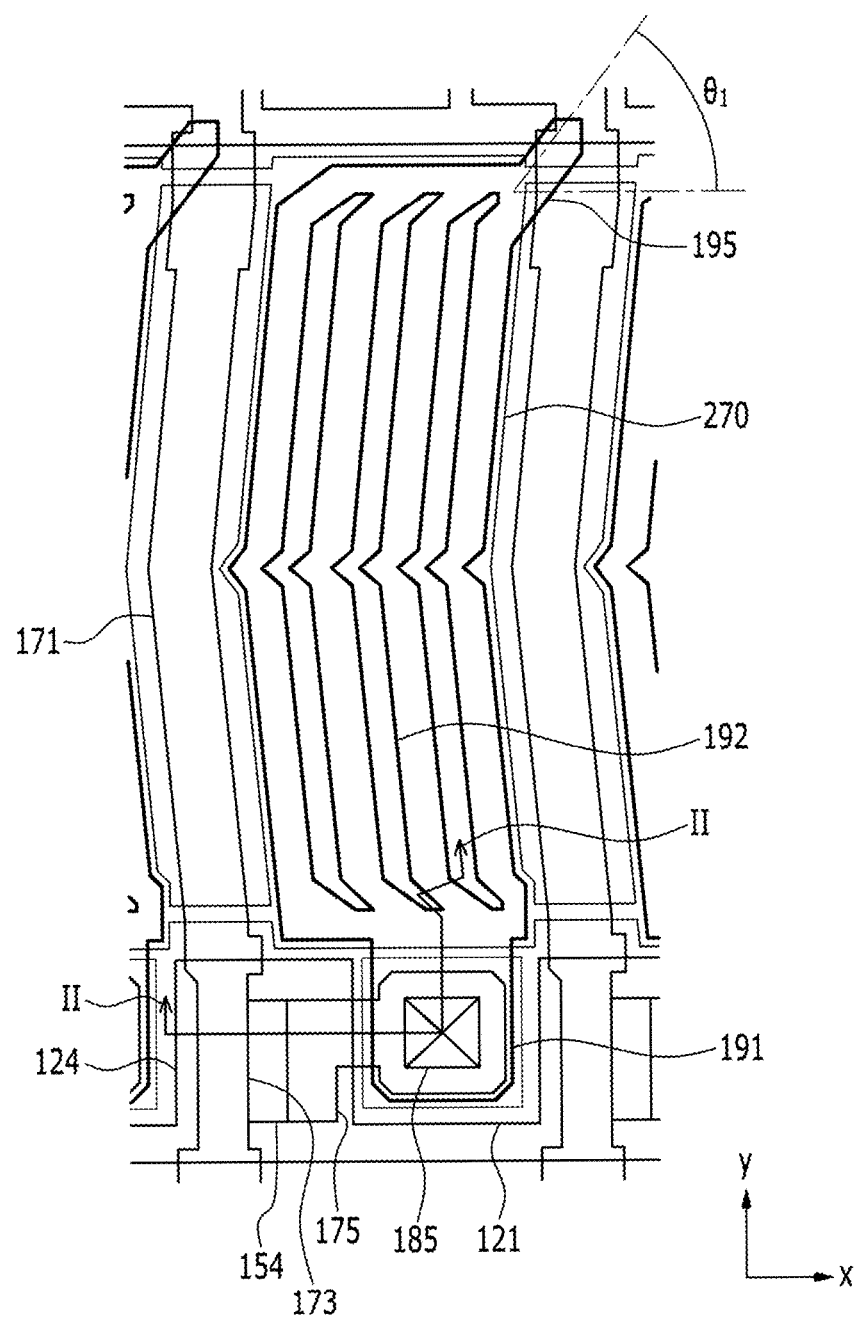
FIG. 1 is a plan view of an exemplary embodiment of a liquid crystal display ("LCD") according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on," "connected to" or "coupled to" another element, it can be directly on the other element or intervening elements may also be present. In contrast, when an element is referred to as being "directly on," "directly connected to" or "directly coupled to" another element, there are no intervening elements present.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example In an exemplary embodiment, if when the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Next, a liquid crystal display ("LCD") according to an exemplary embodiment of the invention will be described with reference to the accompanying drawings.

Figure 2:
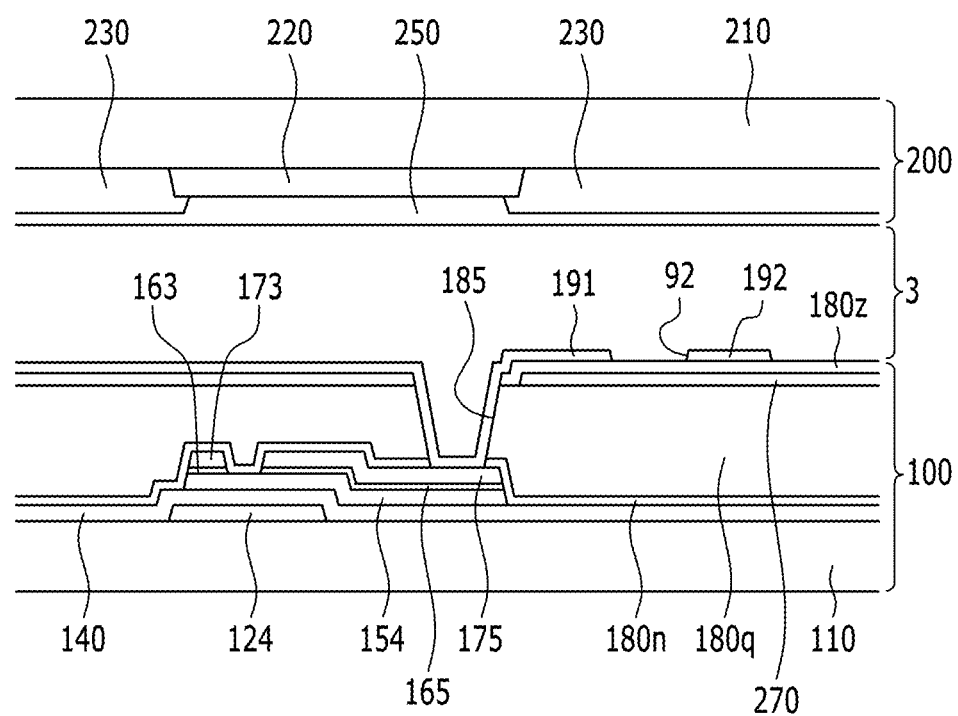
FIG. 2 is a cross-sectional view of the LCD of FIG. 1, taken along line II-II.

First, referring to FIGS. 1 to 8, an LCD according to an exemplary embodiment of the invention will be described. FIG. 1 is a plan view of the LCD according to an exemplary embodiment of the invention, and FIG. 2 is a cross-sectional view of the LCD of FIG. 1, taken along line II-II. FIGS. 3 to 8 are plan views of LCDs according to exemplary embodiments of the invention.

First, referring to FIGS. 1 and 2, an LCD according to an exemplary embodiment of the invention includes a lower panel 100 and an upper panel 200 that face each other, and a liquid crystal layer 3 injected between the two panels 100 and 200.

The lower panel 100 will now be described.

A gate conductor including a gate line 121 is disposed on an insulation substrate 110 including transparent glass, plastic, or the like.

The gate line 121 includes a gate electrode 124 and a wide end portion (not illustrated) for connection with another layer or an external driving circuit. In an exemplary embodiment, the gate line 121 may include aluminum-based metal such as aluminum (Al) or an aluminum alloy, a silver-based metal such as silver (Ag) or a silver alloy, a copper-based metal such as copper (Cu) or a copper alloy, a molybdenum-based metal such as molybdenum (Mo) or a molybdenum alloy, chromium (Cr), tantalum (Ta), and titanium (Ti). However, the invention is not limited thereto, and the gate line 121 may have a multilayered structure including at least two conductive layers having different physical properties.

In an exemplary embodiment, a gate insulating layer 140 including a silicon nitride (SiNx), a silicon oxide (SiOx), or the like is disposed on a gate conductor including the gate line 121. In an exemplary embodiment, the gate insulating layer 140 may have a multilayered structure including at least two insulating layers having different physical properties.

In an exemplary embodiment, a semiconductor 154 including amorphous silicon or polysilicon is disposed on the gate insulating layer 140. In an exemplary embodiment, the semiconductor 154 may include an oxide semiconductor.

Ohmic contacts 163 and 165 may be positioned on the semiconductor 154. In an exemplary embodiment, the ohmic contacts 163 and 165 may include a material such as n+ hydrogenated amorphous silicon in which an n-type impurity such as phosphorus is doped at a high concentration, or of a silicide. The ohmic contacts 163 and 165 may be disposed on the semiconductor 154 to provide a pair. In the case where the semiconductor 154 is the oxide semiconductor, the ohmic contacts 163 and 165 may be omitted.

A data conductor including a data line 171 including a source electrode 173 and a drain electrode 175 is disposed on the ohmic contacts 163 and 165 and the gate insulating layer 140.

The data line 171 includes a wide end portion (not illustrated) for connection with another layer or an external driving circuit. The data line 171 transfers a data signal, and substantially extends in a vertical direction to cross the gate line 121.

In this case, the data line 171 may have a first curved portion with a curved shape in order to acquire maximum transmittance of the LCD, and parts of the curved portion meet each other in a middle region of the pixel area to have a V shape, for example. A second curved portion which is curved to provide a predetermined angle with the first curved portion may be further included in the middle region of the pixel area.

The first curved portion of the data line 171 may be bent at approximately 7 degrees (°) with respect to a vertical reference line (y, a reference line extended in the y direction) which is perpendicular to a direction (x direction) in which the gate line 121 extends. The second curved portion which is disposed at the center region of the pixel area is further bent to define an angle of approximately 7° to 15° with respect to the first curved portion.

The source electrode 173 is a part of the data line 171 and is disposed on the same line as the data line 171. The drain electrode 175 extends so as to be parallel to the source electrode 173. Therefore, the drain electrode 175 is parallel to the part of the data line 171.

The gate electrode 124, the source electrode 173, and the drain electrode 175 provide a thin film transistor ("TFT") together with the semiconductor 154, and a channel of the TFT is provided in the semiconductor 154 between the source electrode 173 and the drain electrode 175.

The LCD according to the exemplary embodiment of the invention includes the source electrode 173 positioned on the same line with the data line 171 and the drain electrode 175 extending in parallel with the data line 171, and as a result, a width of the TFT may be increased while an area occupied by the data conductor is not increased, thereby increasing an aperture ratio of the LCD.

In an exemplary embodiment, the data line 171 and the drain electrode 175 may include a refractory metal such as molybdenum, chromium, tantalum, and titanium, or an alloy thereof, and may have a multilayered structure including a refractory metal layer (not illustrated) and a low resistive conductive layer (not illustrated). In exemplary embodiments, the multilayered structure may include a double layer of a chromium or molybdenum (alloy) lower layer and an aluminum (alloy) upper layer, or a triple layer of a molybdenum (alloy) lower layer, an aluminum (alloy) middle layer, and a molybdenum (alloy) upper layer, for example. However, the invention is not limited thereto, and the data line 171 and the drain electrode 175 may include various metals or conductors other than the metals. In an exemplary embodiment, the width of the data line 171 may be about 3.5 micrometers (μm)±0.75 μm.

A first passivation layer 180n is disposed on the data conductors 171, 173, and 175, the gate insulating layer 140, and an exposed portion of the semiconductor 154. In an exemplary embodiment, the first passivation layer 180n may include an organic insulating material, an inorganic insulating material, or the like.

A second passivation layer 180q is provided on the first passivation layer 180n. In another exemplary embodiment, the second passivation layer 180q can be omitted. In an exemplary embodiment, the second passivation layer 180q may be a color filter. When the second passivation layer 180q is a color filter, the color filter may uniquely display one of primary colors, and examples of the primary colors are three primary colors of red, green, and blue, or yellow, cyan, and magenta, for example. Although not illustrated, in another exemplary embodiment, the color filter may further include other color filters which display a mixed color of the primary colors or white in addition to the primary colors.

A common electrode 270 is provided on the second passivation layer 180q. The common electrode 270 has a planar shape so as to be provided on the entire surface of the insulation substrate 110 as a whole plate, and an opening (not illustrated) which is provided in a region corresponding to the periphery of the drain electrode 175 is defined in the common electrode 270. That is, the common electrode 270 may have a planar shape in a plane view.

Common electrodes 270 which are disposed in adjacent pixels are connected to each other so that a common voltage having a predetermined magnitude supplied from outside of the display area is transmitted thereto.

A third passivation layer 180z is provided on the common electrode 270. The third passivation layer 180z may include an organic insulating material or an inorganic insulating material.

A pixel electrode 191 is provided on the third passivation layer 180z. The pixel electrode 191 includes a curved edge which is substantially parallel to the first curved portion and the second curved portion of the data line 171. A plurality of cutouts 92 is defined in the pixel electrode 191, and a plurality of first branch electrodes 192 is defined by the plurality of cutouts 92.

A contact hole 185 is defined in the first passivation layer 180n, the second passivation layer 180q, and the third passivation layer 180z to expose the drain electrode 175. The pixel electrode 191 is physically and electrically connected to the drain electrode 175 through the contact hole 185 so as to be applied with the voltage from the drain electrode 175.

In the illustrated exemplary embodiment, a plurality of branch electrodes of the pixel electrode 191 is provided in a bundle structure in which the plurality of first branch electrodes 192 is respectively connected through a connection portion at upper and lower portions thereof. In addition, the pixel electrode includes a contact portion extended from the connection portion or the branch electrodes, and the contact portion is electrically connected with the drain electrode through the contact hole as previously described.

Next, the upper panel 200 will be described.

A light blocking member 220 is disposed on a second substrate 210 including transparent glass, plastic, or the like. The light blocking member 220 is called a black matrix and blocks light leakage.

A plurality of color filters 230 is disposed on the second substrate 210. When the second passivation layer 180q of the lower panel 100 is a color filter, the color filter 230 of the upper panel 200 may be omitted. In addition, the light blocking member 220 of the upper panel 200 may also be provided in the lower panel 100.

An overcoat 250 is disposed on the color filter 230 and the light blocking member 220. The overcoat 250 may include an organic or inorganic insulation material, and prevents the color filter 230 from being exposed and provides a flat surface. In another exemplary embodiment, the overcoat 250 may be omitted.

An alignment layer is disposed on the overcoat 250.

In an exemplary embodiment, the liquid crystal layer 3 may include a nematic liquid crystal material having positive dielectric anisotropy. In an exemplary embodiment, liquid crystal molecules of the liquid crystal layer 3 are arranged such that a major axis thereof is disposed parallel to the substrates 110 and 210, and has a structure in which the major axis is spirally twisted at 90° from the alignment direction of the alignment layer of the lower panel 100 to the upper panel 200.

The pixel electrode 191 is applied with a data voltage from the drain electrode 175, and the common electrode 270 is applied with a common voltage with a predetermined magnitude from a common voltage applying unit which is disposed outside the display area.

The pixel electrode 191 and the common electrode 270 which are field generating electrodes generate an electric field so as to rotate the liquid crystal molecules of the liquid crystal layer 3 disposed on the two electrodes 191 and 270 in a direction parallel to a direction of the electric field. The polarization of the light which passes through the liquid crystal layer is varied depending on the rotational direction of the liquid crystal molecule determined as described above.

Figure 3:
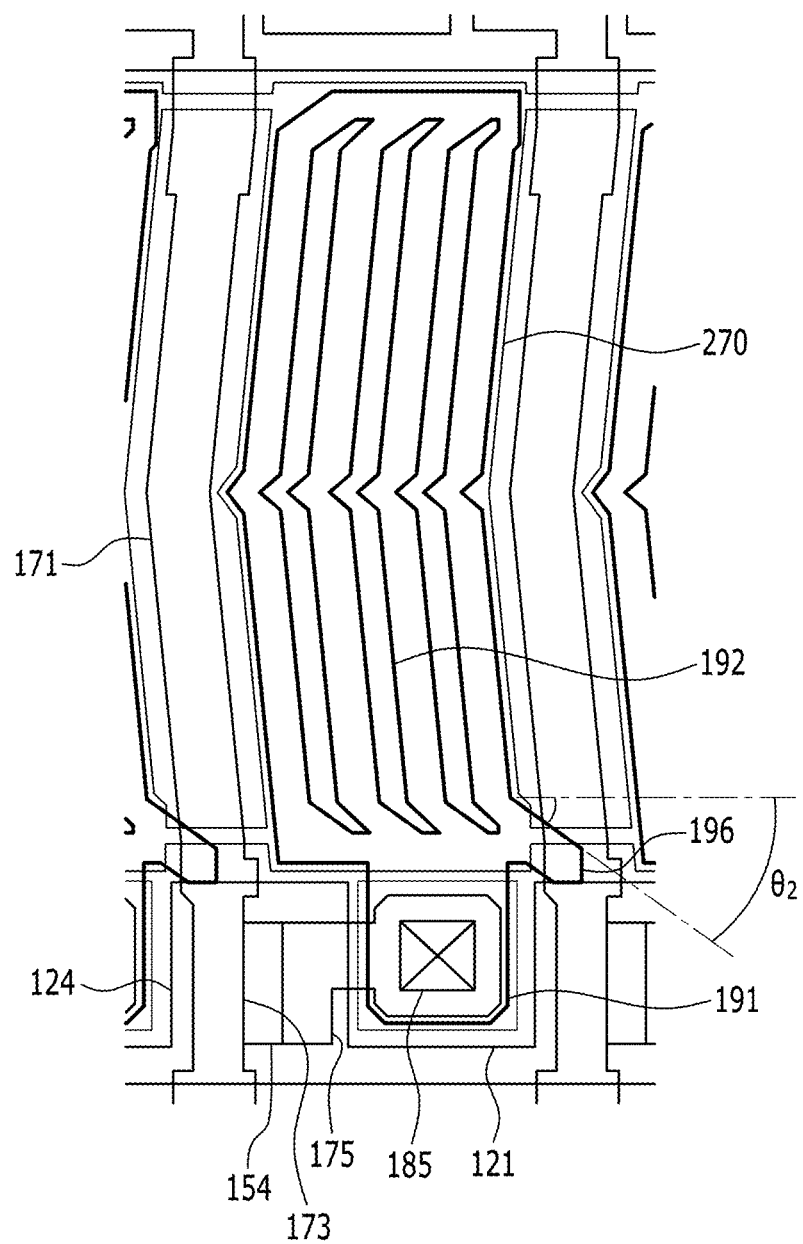
FIGS. 3 to 8 and 10 are plan views of exemplary embodiments of LCDs according to the invention.

Referring to FIGS. 1 and 3, the pixel electrode according to the exemplary embodiment of the invention includes protrusions provided at lower corners or upper corners of the respective first branch electrodes 192. FIG. 1 shows a structure in which upper protrusions 195 are provided in upper portions of the branch electrodes of the pixel electrode, and FIG. 3 shows a structure in which lower protrusions 196 are provided in lower portions of the branch electrodes of the pixel electrode. Referring to FIG. 1, the upper protrusions 195 of the pixel electrode 191 are provided in a direction toward a neighboring pixel in the same direction (e.g., diagonal direction) in which an end portion of the branch electrodes extend, but the length of the upper protrusion 195 is short enough so as not to meet a pixel electrode of the neighboring pixel. It is preferred that the length of the protrusions is long, but that the protrusion does not contact a pixel electrode of the neighboring electrode. FIG. 1 illustrates a case that the upper protrusion 195 of the pixel electrode 191 is provided in the shape of an arrow, but the invention is not limited thereto, and the upper protrusion 195 of the pixel electrode may be provided in the shape of a triangle. A branch electrode where the upper protrusion 195 of the pixel electrode 191 is provided at the rightmost branch electrode of the pixel electrode 191.

In the display device according to the exemplary embodiment of FIG. 3, the lower protrusion 196 is provided in the lower portion of the branch electrodes of the pixel electrode 191. The lower protrusion 196 of the pixel electrode 191 is provided in a direction toward a neighboring pixel in the same direction in which the branch electrodes extend, but the length of the lower protrusion 196 is short enough so as not to meet a pixel electrode of the neighboring pixel. FIG. 3 illustrates a case that the lower protrusion 196 of the pixel electrode 191 is provided in the shape of an arrow, but the invention is not limited thereto, and the lower protrusion 196 of the pixel electrode may be provided in the shape of a triangle.

Referring to FIGS. 1 and 3, the upper protrusion 195 or the lower protrusions 196 of the pixel electrode defines a given angle ($\theta 1$ or $\theta 2$) with a horizontally extended gate line.

Referring to FIG. 1, the angle defined by the upper protrusion 195 of the pixel electrode 191 and the gate line is $\theta 1$, and referring to FIG. 3, the angle defined by the lower protrusion 196 of the pixel electrode 191 and the gate line is $\theta 2$. In an exemplary embodiment, the angles $\theta 1$ and $\theta 2$ may be between about 0 degree to about 90 degrees, and this will be described later.

Figure 4:
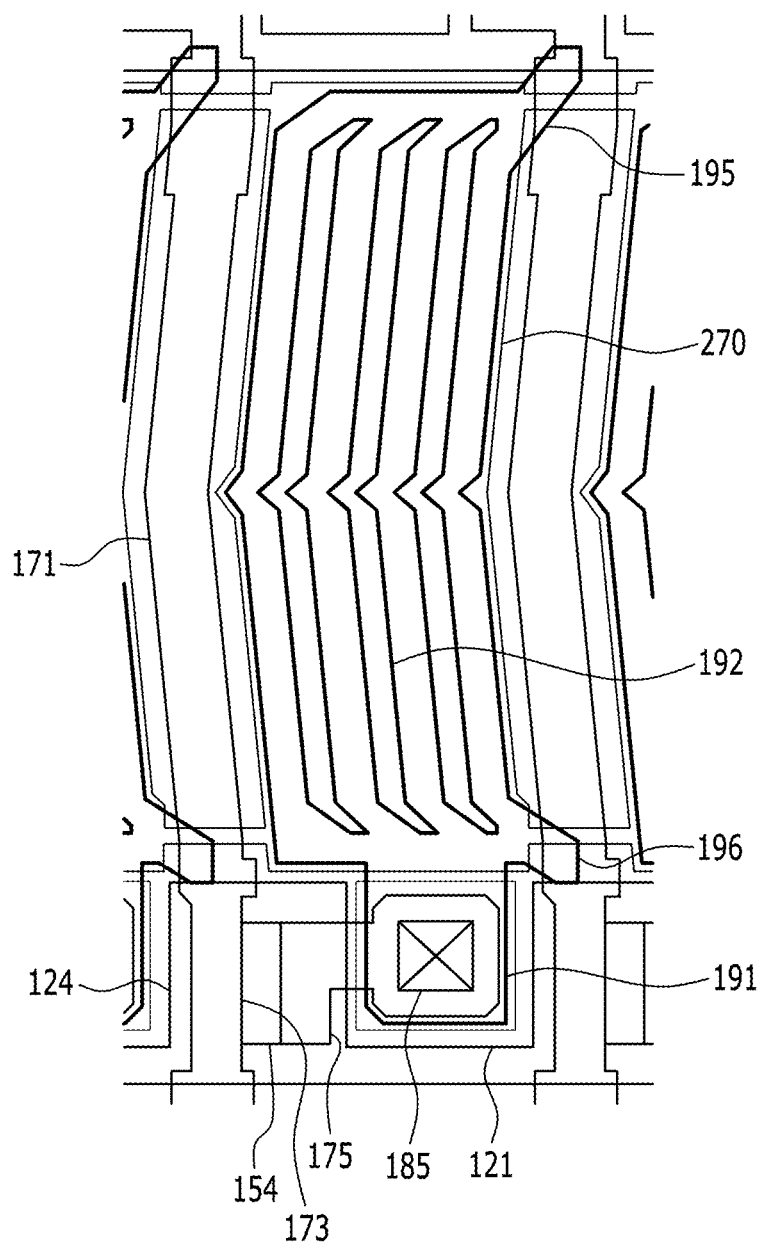

FIG. 4 is a plan view of an LCD according to another exemplary embodiment of the invention. Referring to FIG. 4, in an LCD according to the exemplary embodiment, a protrusion of a pixel electrode 191 is provided in an upper portion and a lower portion. That is, both of an upper protrusion 195 and a lower protrusion 196 are provided in the rightmost pixel branch electrode 192 of the pixel electrode 191.

Figure 5:
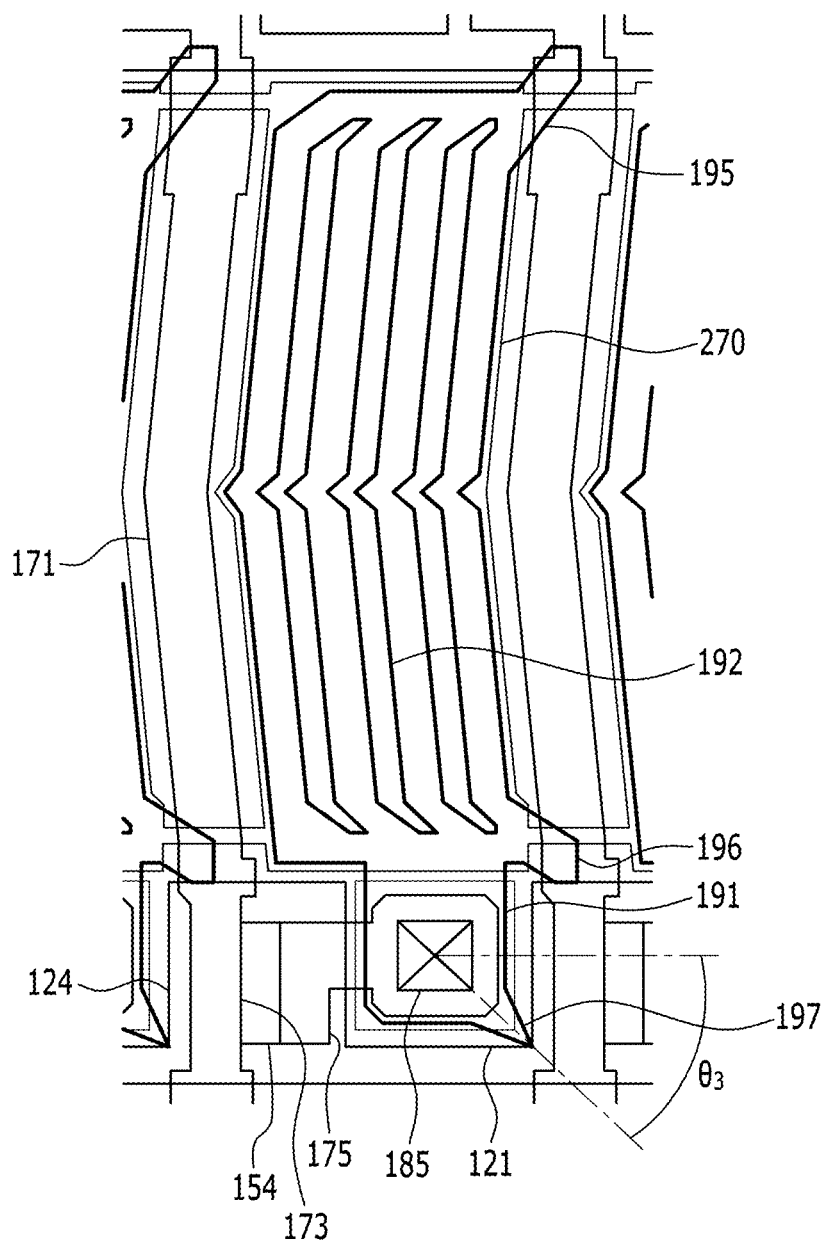

FIG. 5 is a plan view of an LCD according to another exemplary embodiment of the invention. Referring to FIG. 5, an LCD according to the exemplary embodiment additionally includes an electrode protrusion 197 provided in a pixel electrode at a periphery of a contact hole 185.

Referring to FIG. 5, the electrode protrusion 197 is provided in a direction that is similar to a direction of lower protrusions 196. Although it is illustrated that the electrode protrusions 197 of FIG. 5 is provided in the shape of a triangle, the invention is not limited thereto, and the shape of the electrode protrusions 197 may be provided in the shape of an arrow like the lower protrusions 196. In an exemplary embodiment, the electrode protrusion 197 may extend in a lower right direction of one pixel. As shown in FIG. 5, the gate line and the electrode protrusion 197 may define an angle of θ3, and θ3 may be about 0 degree to about 90 degrees.

FIG. 5 illustrates that all of the upper protrusion 195, the lower protrusion 196, and the electrode protrusion 197 are provided, but the invention is not limited thereto, and only the electrode protrusion 197 may be provided. That is, each of the protrusions 195, 196, and 197 may be provided alone, or may be provided with other protrusions.

Figure 6:
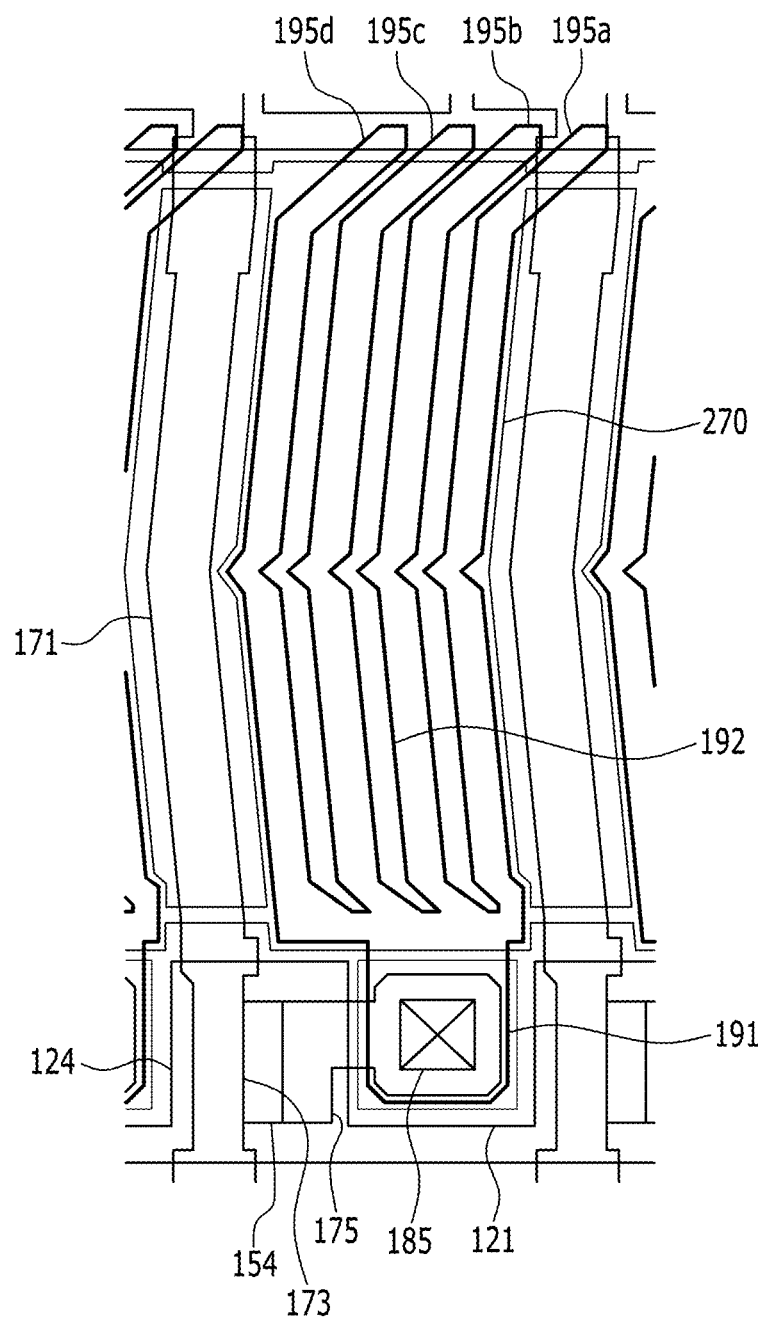

FIG. 6 is a plan view of an LCD according to another exemplary embodiment of the invention. Referring to FIG. 6, the upper protrusion 195 may be provided in all branch electrodes of the pixel electrode 191. That is, the upper protrusion 195 may be provided at upper portions of all the branch electrodes or may be selectively provided in several branch electrodes. FIG. 6 illustrates an LCD in which upper protrusions 195*a*, 195*b*, 195*c*, and 195*d* are provided at all of branch electrodes of the pixel electrode, but the invention is not limited thereto, and the upper protrusion may be provided in one or more branch electrodes among the four branch electrodes. A plurality of upper protrusions, lower protrusions, or electrode protrusions may be provided together.

A protrusion of each pixel electrode may define an angle of about 0 degree to about 90 degrees with respect to an imaginary line that is parallel to the gate line.

Figure 7:
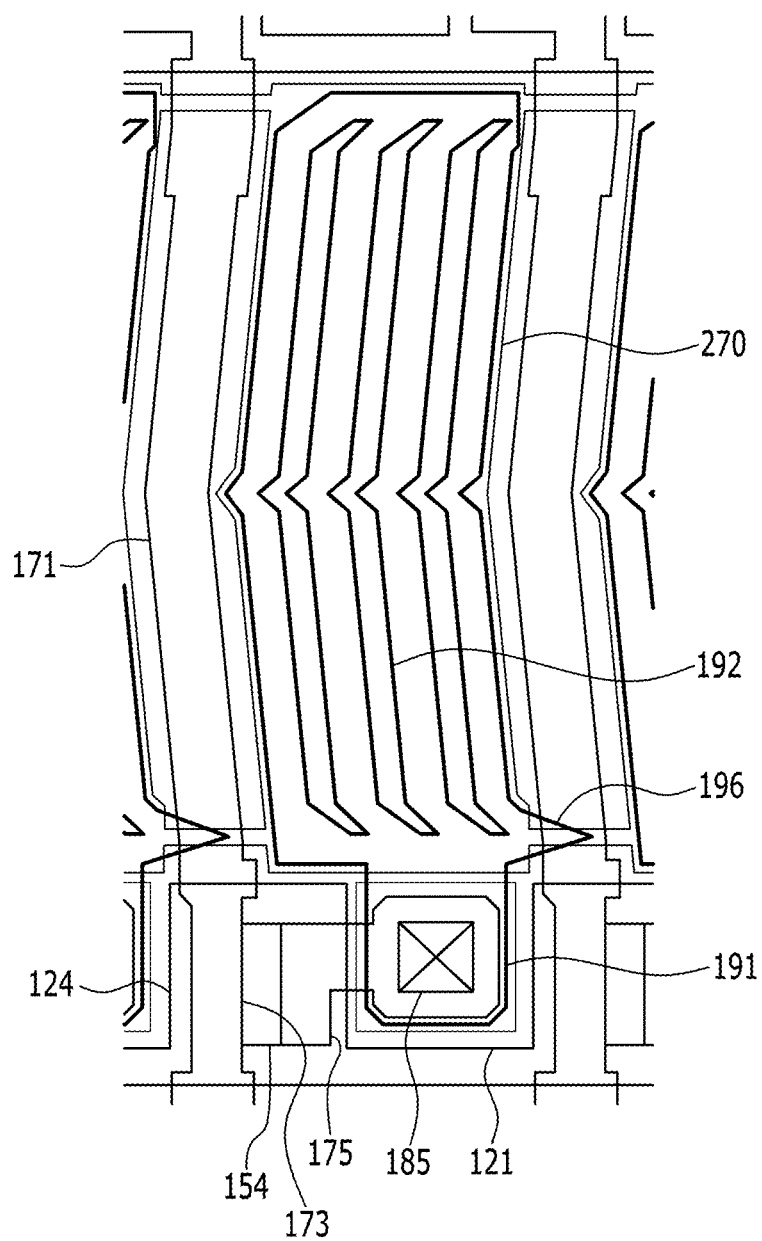
Figure 8:
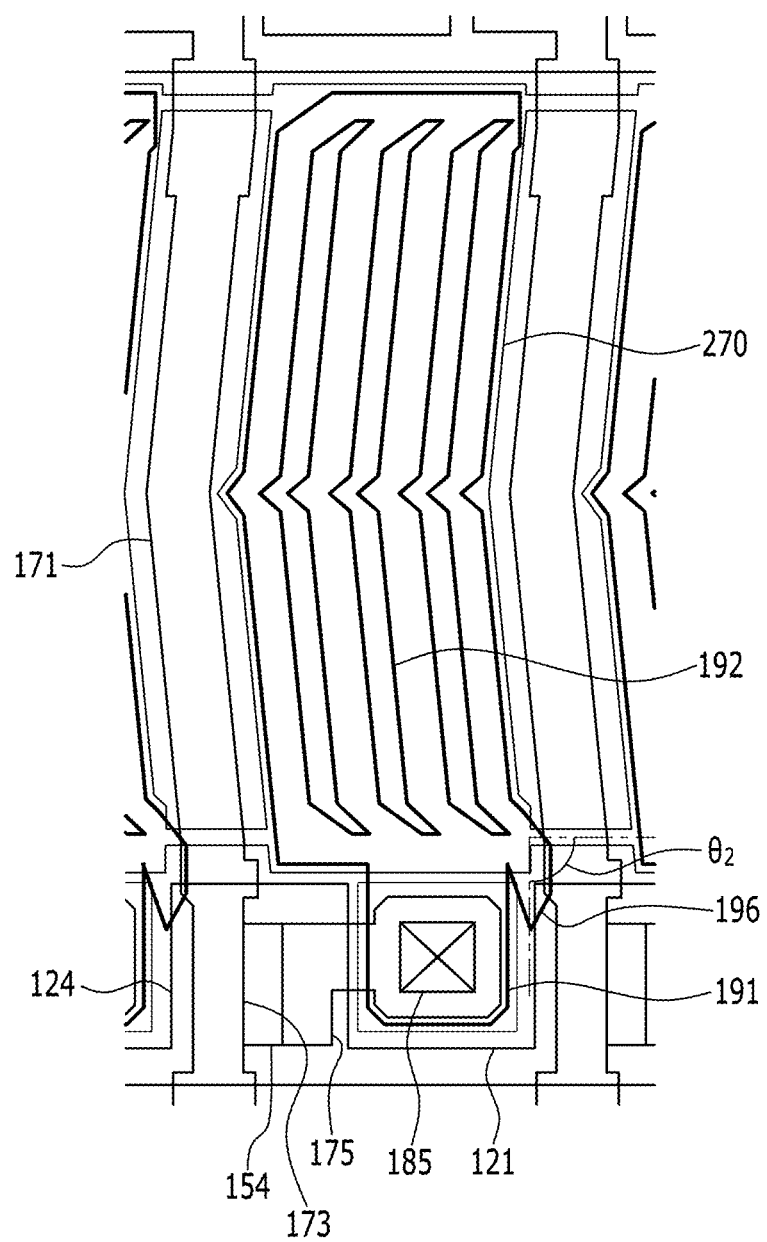

FIGS. 7 and 8 are plan views of an LCD according to another exemplary embodiment of the invention.

Referring to FIG. 7, a lower protrusion of a pixel electrode defines an angle of about 0 degree with reference to an imaginary horizontal line that is parallel to a gate line 121. That is, the lower protrusion 196 of the pixel electrode according to the exemplary embodiment of FIG. 7 is provided in a direction that is parallel to a direction of the gate line 121.

In a display device according to an exemplary embodiment of FIG. 8, a lower protrusion 196 of a pixel electrode defines an angle of about 90 degrees with reference to an imaginary horizontal line that is parallel to a gate line 121. That is, in the pixel electrode of the exemplary embodiment of FIG. 8, the lower protrusion 196 is perpendicular to a direction of the gate line 121, and the lower protrusion 196 is almost parallel to a direction of the data line 171.

In the display device according to the exemplary embodiment of the invention, the lower protrusion 196 and an imaginary horizontal line that is parallel to the gate line 121 may define an angle of 0 degree to 90 degrees. In FIGS. 7 and 8, the lower protrusion 196 of the pixel electrode is exemplarily described, but such a description can be equally applied to the upper protrusion 195 or the electrode protrusion 197 of the pixel electrode. That is, the upper protrusion 195 or the electrode protrusion 197 of the pixel electrode may define an angle of about 0 degree to about 90 degrees with reference to an imaginary horizontal line that is parallel to the gate line 121.

As shown in FIG. 5, an angle defined by the electrode protrusion 197 and the imaginary horizontal line that is parallel to the gate line 121 is measured in a clockwise direction. As shown in FIG. 8, an angle defined by the lower protrusion 196 and the imaginary horizontal line that is parallel to the gate line 121 is measured in a clockwise direction. However, as shown in FIG. 1, an angle defined by the upper protrusion 195 and the imaginary horizontal line that is parallel to the gate line 121 is measured in a counterclockwise direction.

Figure 9:
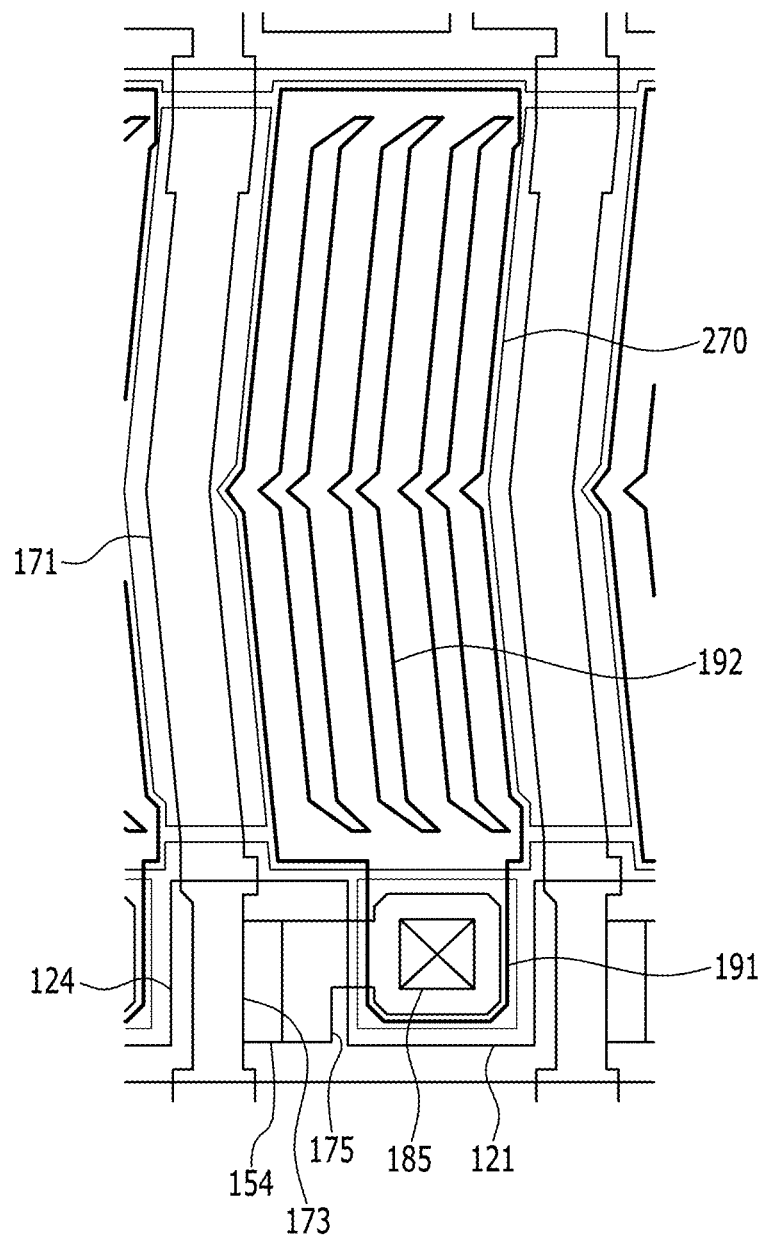
FIG. 9 is a plan view of a comparative example of an LCD according to the invention.

As described, in a pixel electrode according to the exemplary embodiment of the invention, a protrusion is provided in an upper portion, a lower portion, or an electrode portion of the pixel electrode. Such a pixel electrode protrusion solves a problem of a reverse electric field generated in a boundary area of the pixel electrodes, and this will be described in detail later. In case of the LCD according to the comparative example of the invention, as shown in FIG. 9, a reverse electric field is generated in the boundary portion of the pixel electrodes such that liquid crystals are aligned in the opposite direction, thereby causing white bruising. When the white bruising occurs, liquid crystals in a specific area are arranged in a direction that is opposite (i.e., a reverse direction) to a direction (i.e., a forward direction) in which peripheral liquid crystals are arranged and thus a spot occurs, and the spot remains rather than being spontaneously recovered. The white bruising generally occurs in a boundary area of pixel electrodes where a weak forward electric field is generated or a reverse electric field is generated, and such white bruising occurring at the boundary area (end portion) may spread to a viewed pixel area. This is viewed as a spot in the LCD.

However, in the LCD according to the exemplary embodiment of the invention, the pixel electrode protrusion is provided at a peripheral area of the pixel electrode where the reverse electric field is generated to thereby reinforce the forward electric field. Accordingly, liquid crystals are aligned in a forward direction at the boundary area of the pixel electrode, and therefore occurrence of white bruising due to reverse liquid crystal alignment can be prevented.

Figure 10:
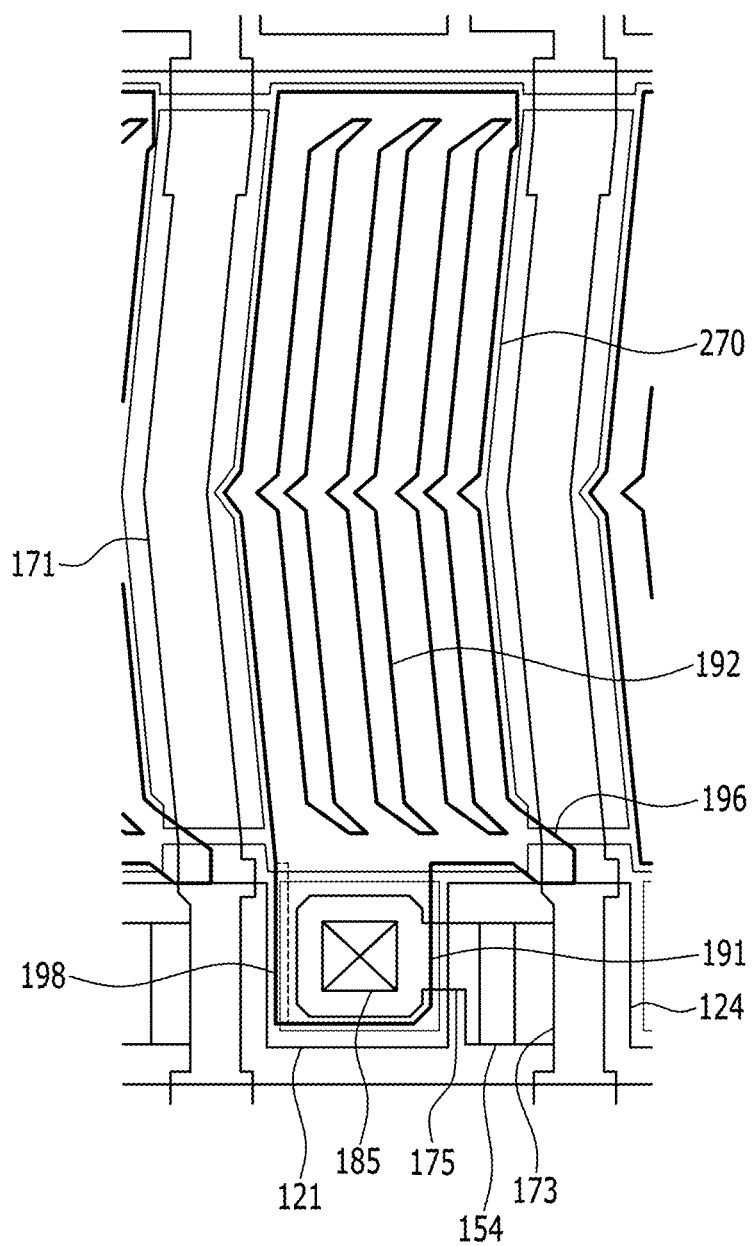

FIG. 10 is a plan view of an LCD according to another exemplary embodiment of the invention. Referring to FIG. 10, a contact hole 185 of a pixel electrode in an LCD according to the exemplary embodiment is the opposite area to the previous exemplary embodiments. That is, the contact hole 185 of the pixel electrode in the previous exemplary embodiments is defined close to the right data line 171, but in the exemplary embodiment, the contact hole 185 of the pixel electrode is defined close to the left data line 171. This is for convenience of data voltage supply, and a pixel where the contact hole is provided in the right side and a pixel where the contact hole is provided in the left side may be alternately arranged. Thus, distances from contact holes of pixels that neighbor each other in lateral sides to the data line 171 disposed therebetween may be similar to each other, and a data voltage can be more stably transmitted.

In this case, in the display device according to the exemplary embodiment of FIG. 10, a contact portion of a pixel electrode protruded to contact a drain electrode may additionally include an electrode addition portion 198. As shown in FIG. 10, the leftmost branch electrode and the left edge of the contact portion of the pixel electrode match each other. That is, when the pixel electrode addition portion 198 is not provided, the contact portion of the pixel electrode and the edge of the left pixel branch electrode do not match as marked by the dotted line of FIG. 10. In such a boundary area, liquid crystals are aligned in a direction (i.e., a reverse direction) that is opposite to a direction of other areas, and this is viewed as white bruising.

However, in the LCD according to the exemplary embodiment, the pixel electrode addition portion 198 is provided in the contact portion of the pixel electrode. Thus, reverse direction alignment of liquid crystals due to mismatch in the contact portion of the pixel electrode and the edge of the pixel branch electrode can be prevented and white bruising can be solved.

Although not illustrated, in an exemplary embodiment, an alignment layer may be coated on the pixel electrode 191 and the third passivation layer 180*z*, may be a horizontal alignment layer, and may be rubbed in a predetermined direction. However, according to an LCD according to another exemplary embodiment of the invention, the alignment layer may include a photo-reactive material to be photo-aligned.

Next, LCDs according to other exemplary embodiments of the invention will be described. FIGS. 11 to 15 and 17 are plan views of LCDs according to other exemplary embodiments of the invention. FIG. 16 is a plan view of an LCD according to a comparative example of the invention. The LCDs according to the exemplary embodiments of the invention of FIGS. 11 to 15 and 17 are similar to those of the exemplary embodiments of FIGS. 1 to 8 and 10. The same constituent elements will not be further described.

The LCD according to the exemplary embodiment of FIG. 1 to FIGS. 8 and 10 has a bundle structure in which upper portions of the pixel electrode are connected with each other. In contrast, the LCD according to the exemplary embodiment of FIGS. 11 to 18 has an open-type structure in which upper portions of branch electrodes of the pixel electrode are separated from each other. That is, the LCD according to the exemplary embodiment of FIG. 1 to FIGS. 8 and 10 and the LCD according to the exemplary embodiment of FIGS. 11 to 18 are the same as each other, except whether the upper portions of the pixel electrode are connected or separated.

Figure 11:
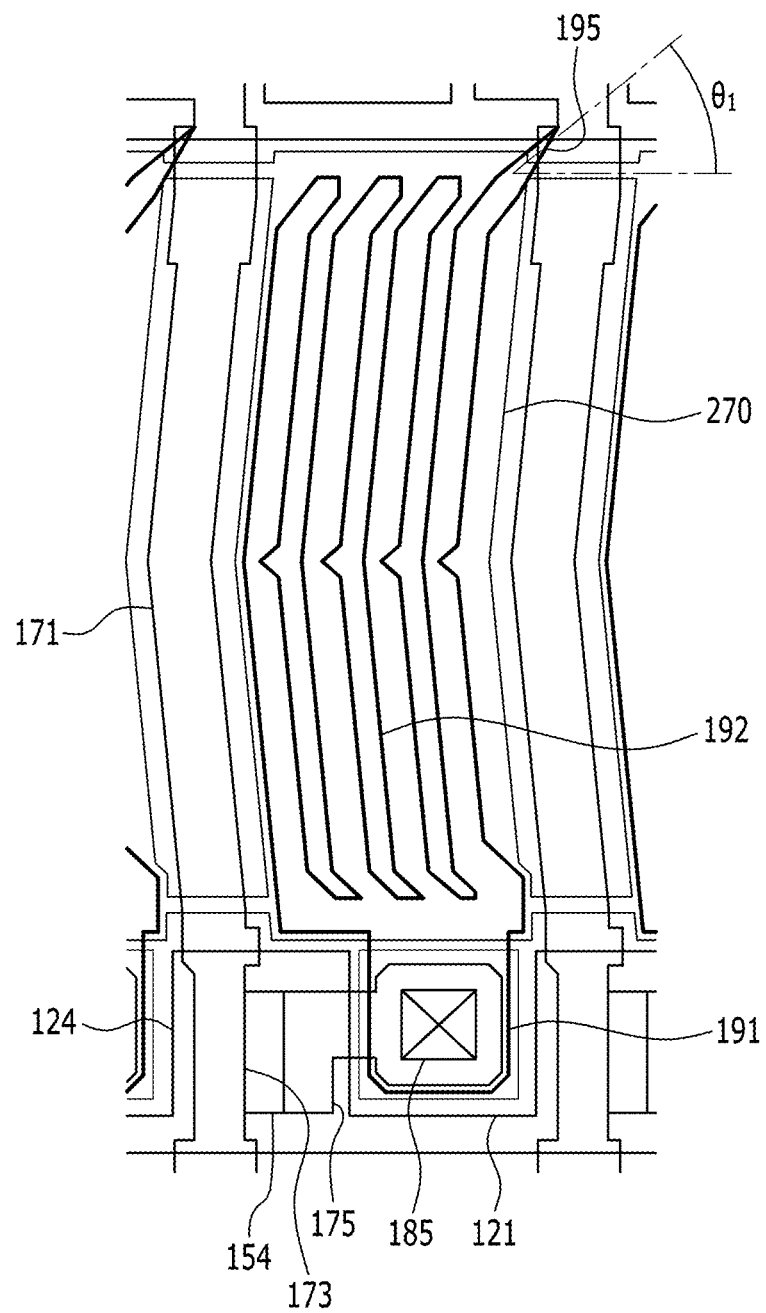
FIGS. 11 to 15 and 17 are plan views of another exemplary embodiment of an LCD according to the invention.

FIG. 11 illustrates a structure in which an upper protrusion 195 of the pixel electrode is provided. Except that respective branch electrodes of the pixel electrode are separated from each other, the LCD of FIG. 11 is the same as the LCD of FIG. 1. An angle defined by the upper protrusion 195 and an imaginary vertical line that is parallel to the gate line may be about 0 degree to about 90 degrees.

Figure 12:
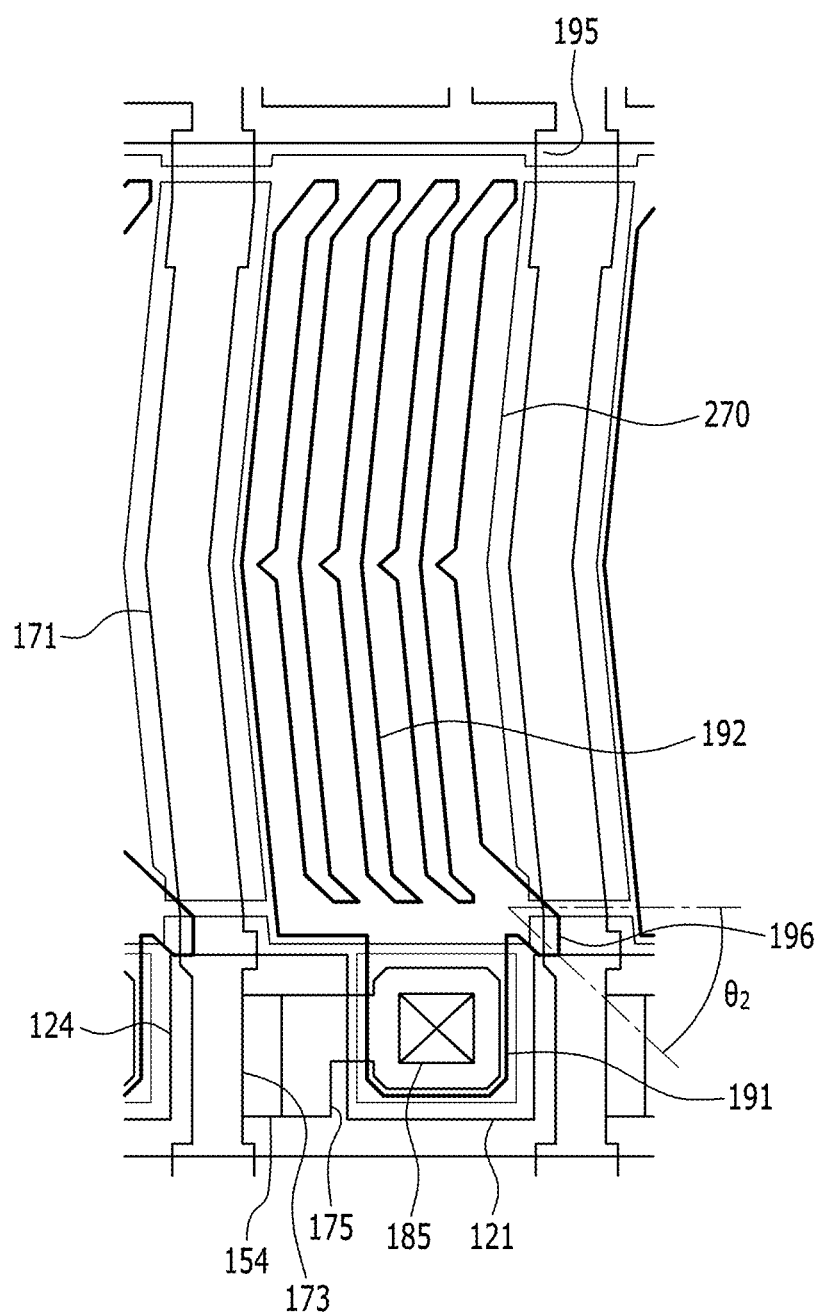

FIG. 12 illustrates a structure in which a lower protrusion 196 of a pixel electrode is provided. The LCD of FIG. 12 is the same as the LCD according to the exemplary embodiment of FIG. 3, except that branch electrodes of a pixel electrode are separated from each other. FIG. 12 illustrates an arrow-shape lower protrusion 196, but the invention is not limited thereto, and the shape of the lower protrusion 196 may be a triangle.

Figure 13:
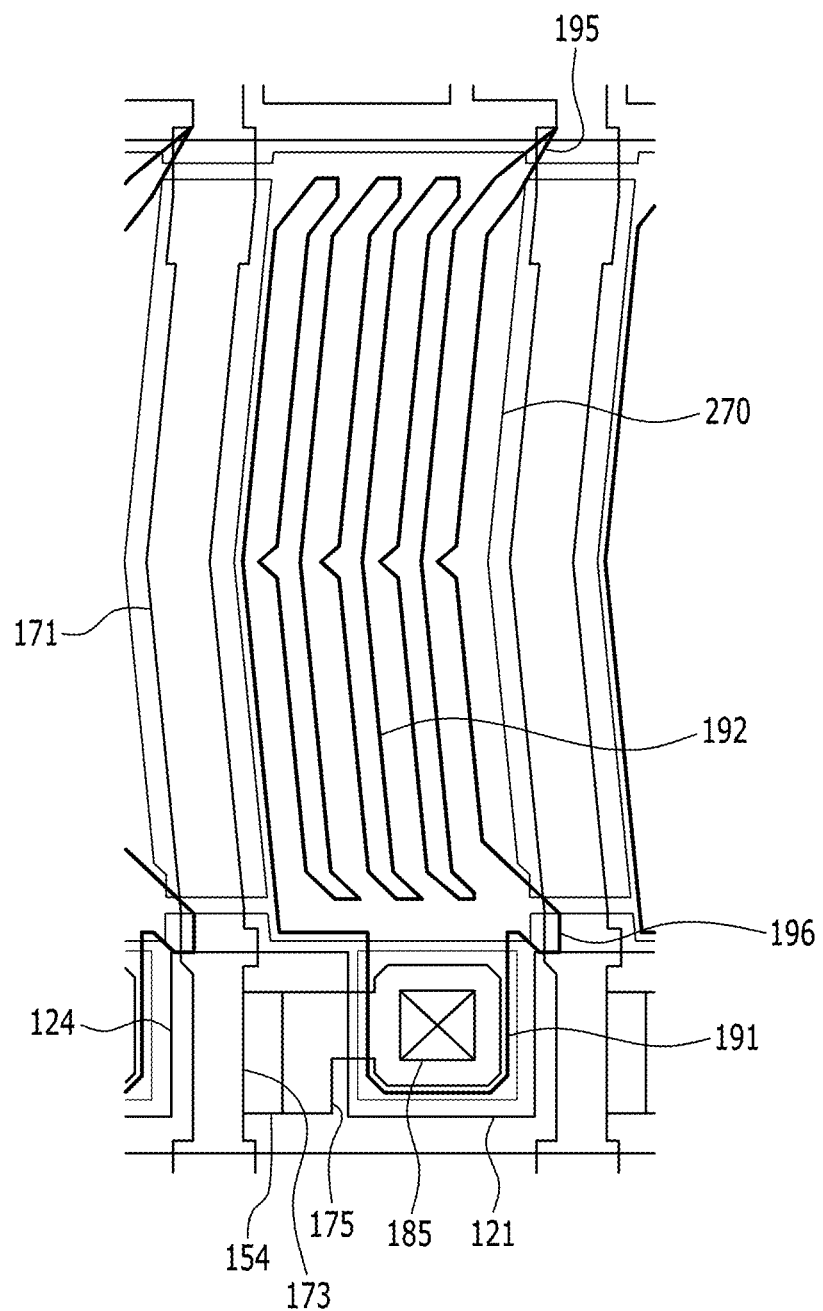

FIG. 13 illustrates a structure in which both of an upper protrusion 195 and a lower protrusion 196 of a pixel electrode are provided. The LCD of FIG. 13 is the same as the LCD according to the exemplary embodiment of FIG. 4, except that branch electrodes of the pixel electrode are separated from each other. In an exemplary embodiment, in the structure of FIG. 13, the upper protrusion 195 may be provided in a plurality of pixel branch electrodes.

Figure 14:
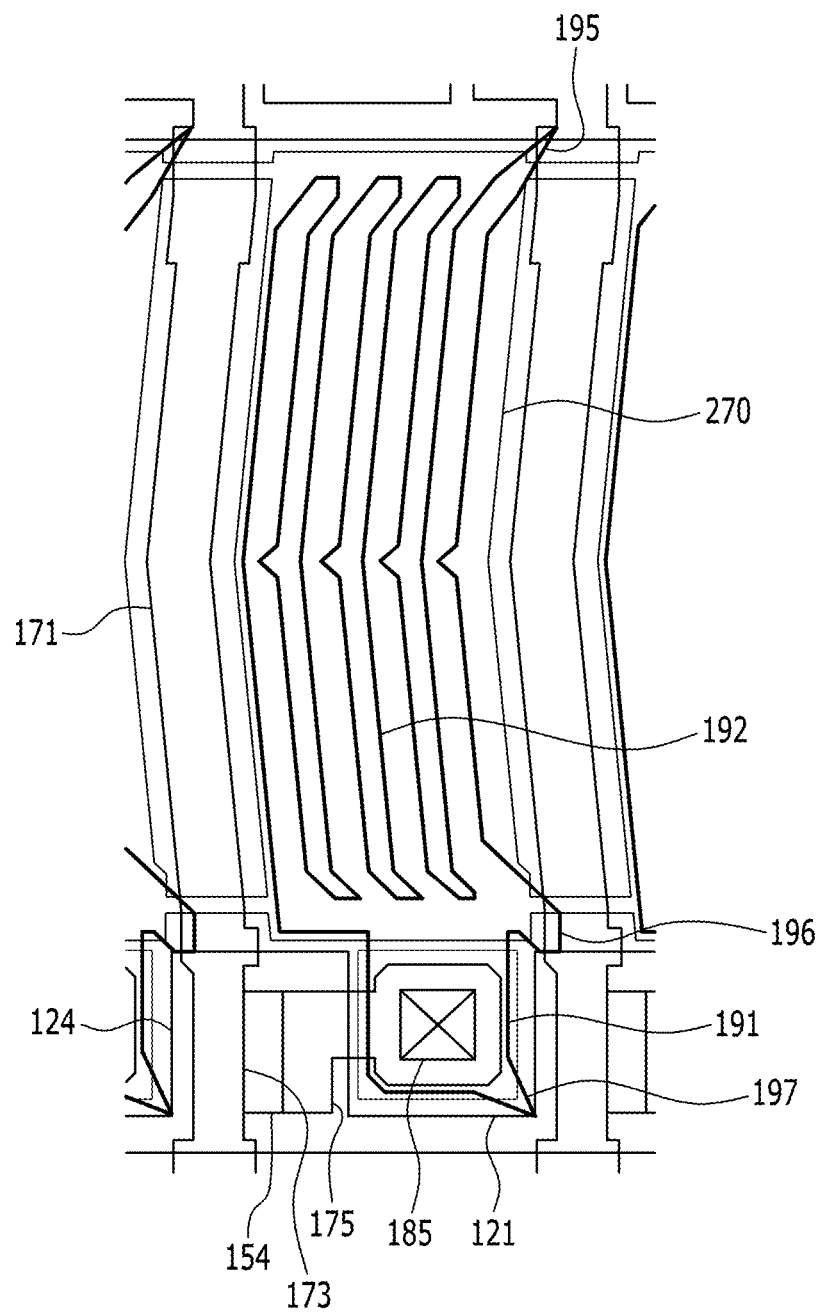

FIG. 14 illustrates a structure in which an upper protrusion 195, a lower protrusion 196, and an electrode protrusion 197 of a pixel electrode are provided. The LCD of FIG. 14 is the same as the LCD according to the exemplary embodiment of FIG. 5, except that branch electrodes of the pixel electrode are separated from each other. The respective protrusions and an imaginary vertical line that is parallel to a gate line may define the same angle or may define different angles.

Figure 15:
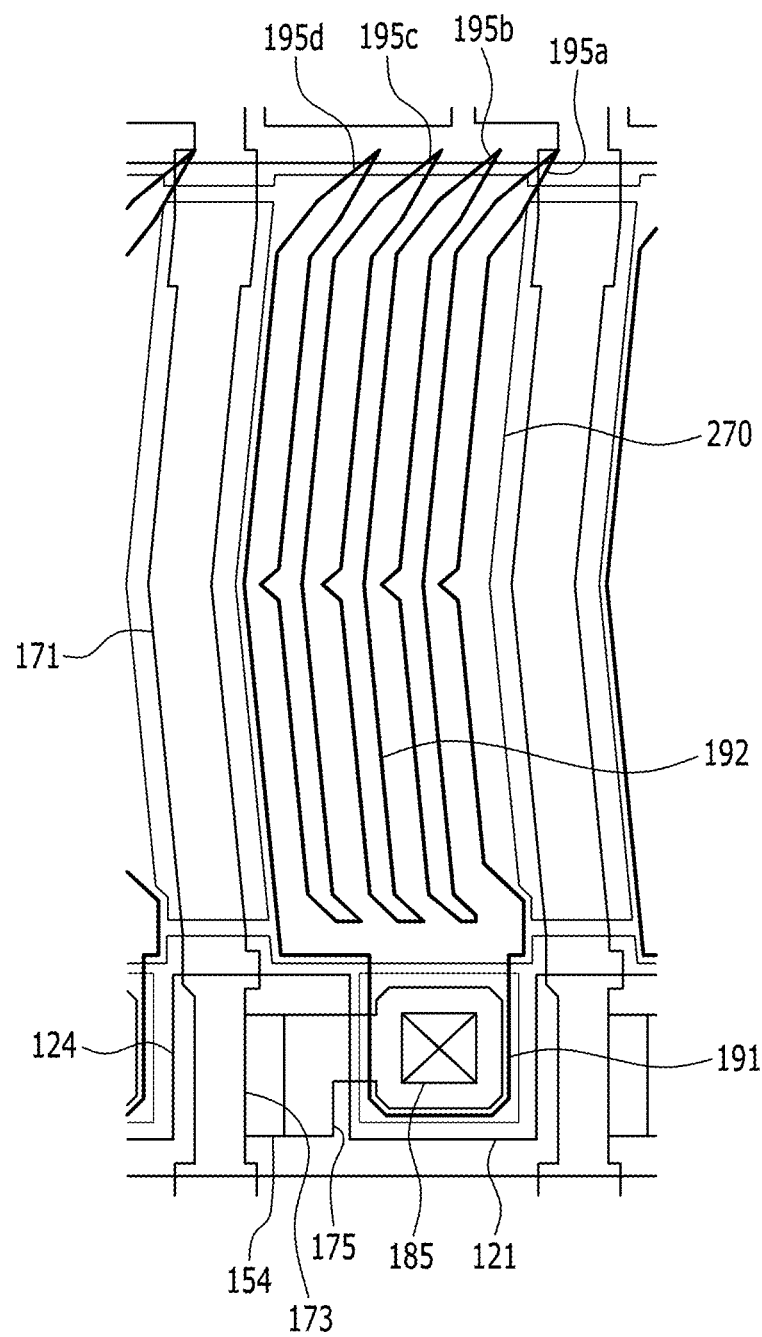
Figure 16:
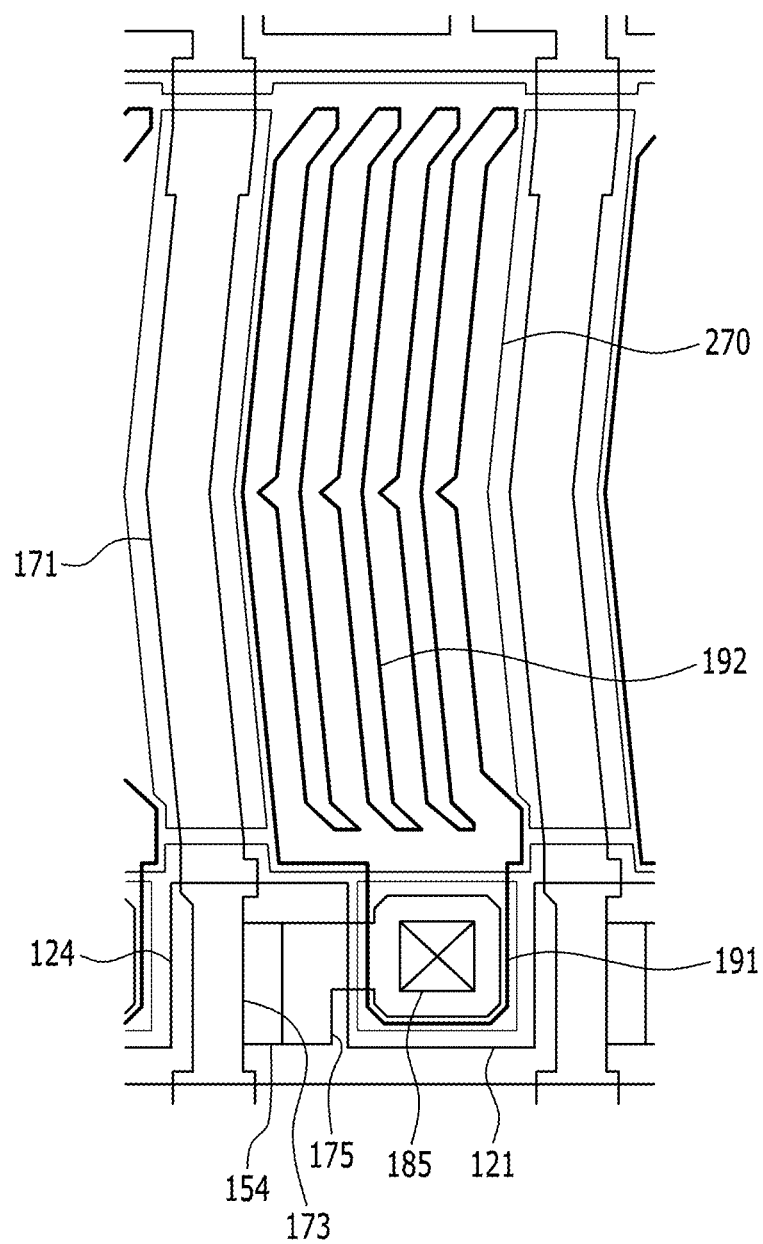
FIG. 16 is a plan view of a comparative example of an LCD according to the invention.

FIG. 15 illustrates a structure in which upper electrode protrusions 195*a*, 195*b*, 195*c*, and 195*d* are provided in a plurality of branch electrodes of a pixel electrode. In an exemplary embodiment, the upper electrode protrusions 195*a*, 195*b*, 195*c*, and 195*d* may be selectively provided only in several branch electrodes. However, since the rightmost branch electrode is most susceptible to white bruising, the upper electrode protrusion 195*a* is provided in the rightmost branch electrode.

FIG. 16 shows a plan view of an LCD according to a comparative example of the invention. Referring to FIG. 16, the LCD according to the comparative example has an open-type structure in which upper portions of branch electrodes of the pixel electrode are separated from each other, and no protrusion is provided in the pixel electrode. Thus, a direction of an electric field generated in the liquid crystals becomes a reverse direction at an upper end area, a lower end area, and a peripheral area of a contact area, and thus liquid crystals area arranged in a reverse direction. However, in the LCD according to the exemplary embodiment of the invention, a pixel electrode protrusion is provided at a location where a reverse directional electric field can be easily generated to thereby prevent reverse directional alignment of liquid crystals. Accordingly, the problem of occurrence of white bruising due to reverse directional alignment of liquid crystals can be solved.

Figure 17:
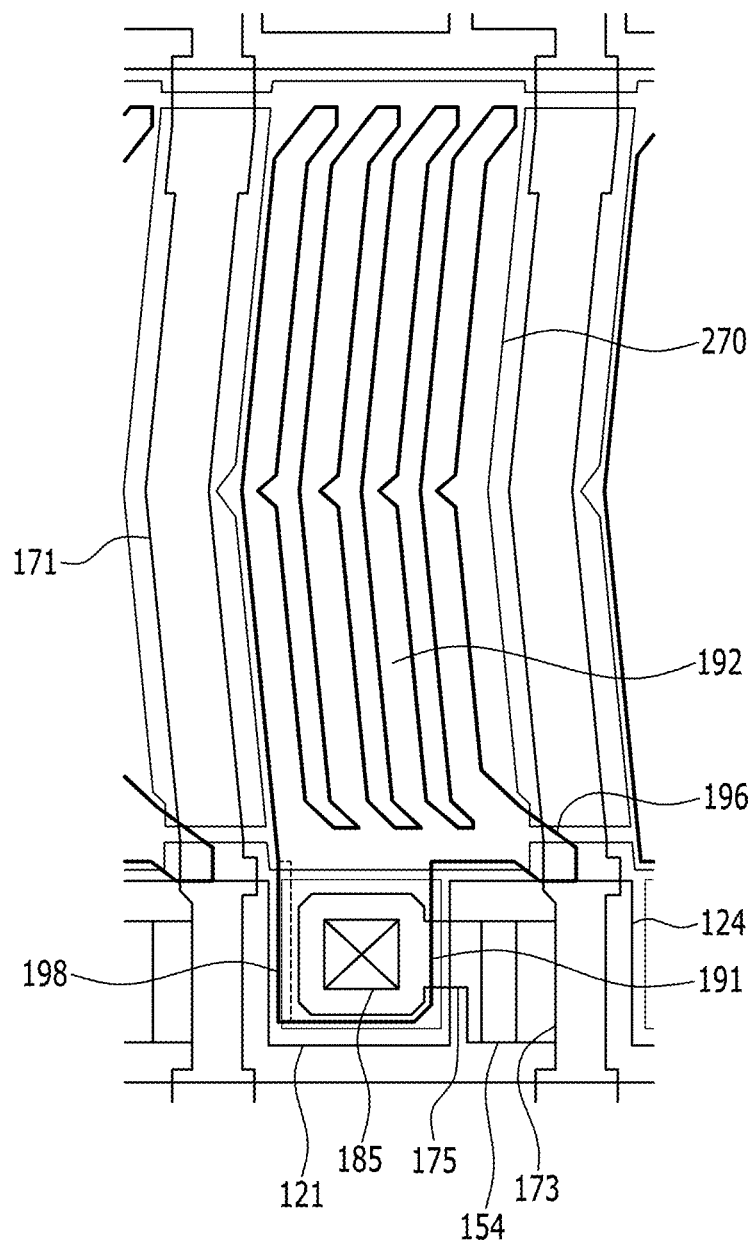

FIG. 17 illustrates an LCD in which a contact portion of a pixel electrode is disposed in the opposite side. The LCD of FIG. 17 is the same as that of the exemplary embodiment of FIG. 10, except that branch electrodes of the pixel electrode are separated from each other. Since the pixel electrode includes an electrode addition portion 198, the leftmost edge of the branch electrodes of the pixel electrode and the contact portion of the pixel electrode are located in the same line.

Figure 18:
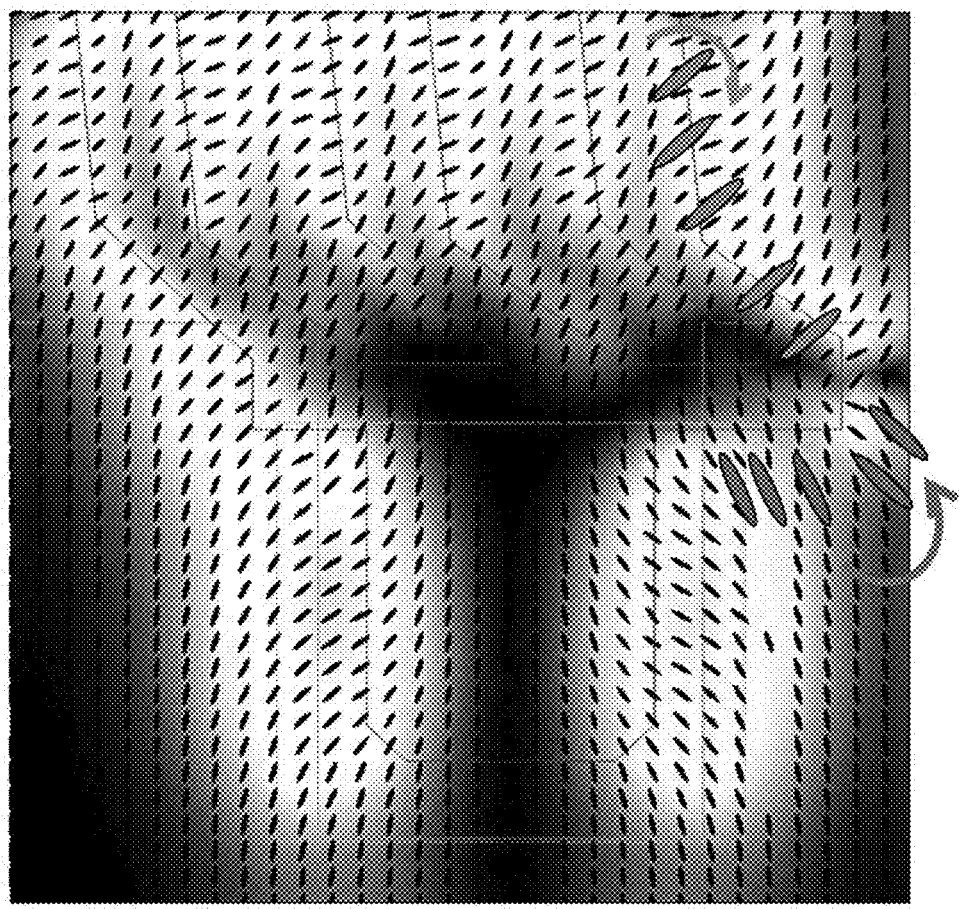
FIG. 18 is an image illustrating the comparative example of alignment of liquid crystal of the LCD according to the invention.
Figure 19:
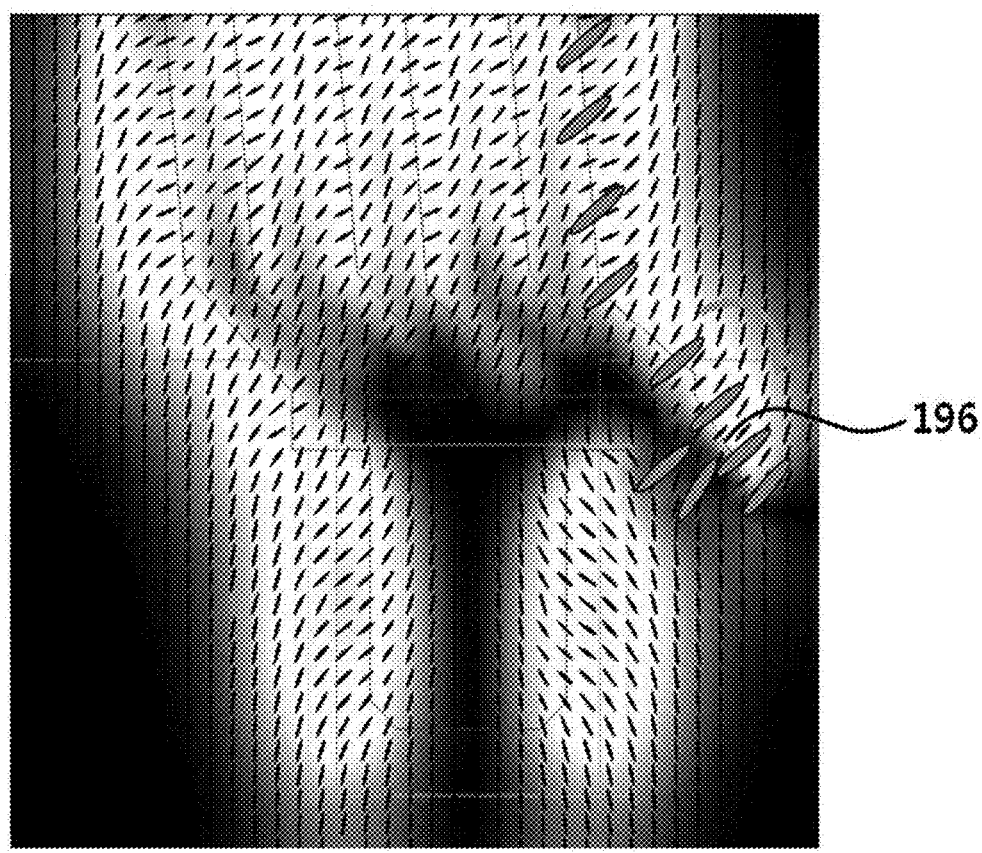
FIG. 19 is an image illustrating an exemplary embodiment of alignment of liquid crystal of the LCD according to the invention.

Next, referring to FIGS. 18 and 19, an effect of the LCD according to the exemplary embodiment of the invention and an effect of an LCD according to a comparative example of the invention will be compared.

FIG. 18 shows a liquid crystal alignment of an LCD according to a comparative example of the invention. FIG. 19 shows a liquid crystal alignment of an LCD according to the exemplary embodiment of the invention.

Referring to FIG. 18, liquid crystal molecules are arranged in different directions at a lower right end of a pixel electrode. The liquid crystal molecules in the upper portion in FIG. 18 are arranged in a forward direction (upper arrow) and the liquid crystal molecules in the middle portion are arranged in a reverse direction (lower arrow).

The reverse directional alignment of the liquid crystals can easily occur at a boundary area of pixel electrodes, that is, a middle area or lateral end areas where pixel electrodes are bent. This is because the forward electric field is not sufficient to align the liquid crystals in the forward direction. That is, as shown in FIG. 18, a direction of an electric field generated at lateral ends of the pixel electrode is changed, and liquid crystal molecules at the peripheral area are arranged in a reverse direction. The reverse directional alignment of the liquid crystal molecules in the specific area causes neighboring liquid crystal molecules to be arranged in a reverse direction, and such a reverse directional alignment of liquid crystal molecules spreads to a peripheral area of a pixel electrode that is not blocked by a black matrix. Such liquid crystal molecules are viewed as a spot or cause deterioration of luminance, and this is referred to as white bruising.

However, in the LCD according to the exemplary embodiment of the invention, protrusions are provided in boundary areas (i.e., upper portion, lower portion, or contact areas of pixel electrodes) of the pixel electrodes. FIG. 19 is an image illustrating alignment of liquid crystal molecules with respect to an LCD in a case that a lower protrusion 196 is provided in a pixel electrode. Referring to FIG. 19, it can be observed that liquid crystal molecules are arranged in a forward direction in a lower right end of the pixel electrode. Thus, a reverse directional alignment of liquid crystal molecules does not occur, and accordingly, a white bruising problem due to the reverse directional alignment of liquid crystal molecules does not occur.

This is because, as shown in FIG. 19, a protrusion structure is provided at a boundary area where a direction of a pixel electrode is changed such that electric fields are generated in the same direction. In the boundary area where a direction of a pixel electrode is changed, a horizontal electric field applied to liquid crystal molecules is weakened and its direction is also changed. Thus, although a reverse directional alignment of liquid crystal molecules occurs, a protrusion is provided in the boundary are of the pixel electrodes of the LCD according to the exemplary embodiment so that a direction of an electric field is maintained without being changed in the boundary area of the pixel electrodes. Accordingly, the problem of white bruising due to the reverse directional alignment of liquid crystal can be solved.

In general, the liquid crystal molecules in the boundary area of the pixel electrodes are easily arranged in a reverse direction as a voltage applied to the LCD is increased. Thus, as the voltage applied to the LCD is increased, white bruising more easily occurs, and therefore the voltage applied to the LCD cannot be increased over a predetermined voltage level. As a result of an experiment, a spot due to white bruising is viewed when a voltage applied to the LCD according to the comparative exemplary embodiment is higher than about 7.9 volts (V). However, in the LCD according to the invention exemplary embodiment, no white bruising occurs even through a voltage applied to the LCD is higher than about 8.0 V, and accordingly no spot is viewed.

As described, in the LCD according to the exemplary embodiment of the invention, protrusions are provided in boundary areas (i.e., upper portion, lower portion, or contact areas of pixel electrodes) of the pixel electrodes so that the reverse directional alignment of the liquid crystal can be prevented. Accordingly, the LCD can be driven with a higher voltage, and occurrence of a spot due to the reverse directional alignment of the liquid crystal molecules of the pixel electrode can be prevented.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
a first substrate;
gate lines disposed on the first substrate;
a gate insulating layer disposed on the gate lines;
a semiconductor layer disposed on the gate insulating layer;
data lines and a drain electrode disposed on the semiconductor layer;
a passivation layer which covers the data lines and the drain electrode and in which a contact hole which partially exposes the drain electrode is defined;
a common electrode provided above the passivation layer;
a pixel electrode which is electrically connected with the drain electrode through the contact hole, overlapped with the common electrode, and comprises:
a plurality of branch electrodes connected to each other through a connection portion from upper portions and lower portions thereof;
a contact portion which is extended from the connection portion, and electrically connected with the drain electrode through the contact hole; and
a protrusion protruding toward a neighboring pixel of the plurality of branch electrodes is provided at least one corners among the connection portion or the contact portion of the pixel electrode; and
a second substrate corresponding to the first substrate,
wherein, in a whole area of the protrusion, a width of the protrusion is gradually decreased toward an end thereof such that the protrusion has first and second end sides which respectively extend in directions different from a length extension direction of the protrusion.

2. The liquid crystal display of claim 1, wherein the protrusion is provided by being extended from a pixel branch electrode of the plurality of branch electrodes and is provided in the same plane as the plurality of branch electrodes.

3. The liquid crystal display of claim 1, wherein the protrusion is provided in a top end of a rightmost branch electrode of the plurality of branch electrodes.

4. The liquid crystal display of claim 3, wherein the protrusion is provided in the top end of at least one branch electrode of the plurality of branch electrodes.

5. The liquid crystal display of claim 4, wherein the protrusion and the gate lines define an angle of about 0 degree to about 90 degrees.

6. The liquid crystal display of claim 1, wherein the protrusion is provided in the lower end of a rightmost branch electrode of the plurality of branch electrodes.

7. The liquid crystal display of claim 6, wherein the protrusion and the gate lines define an angle of about 0 degree to about 90 degrees.

8. The liquid crystal display of claim 1, wherein the protrusion is provided in one corner of a contact area where the pixel electrode contacts the drain electrode.

9. The liquid crystal display of claim 8, wherein the protrusion and the gate lines define an angle of about 0 degree to about 90 degrees.

10. The liquid crystal display of claim 8, wherein a pixel electrode addition portion is provided in one side of the contact portion of the pixel electrode, and an edge of the pixel electrode and an edge of the plurality of branch electrodes are placed on the same line.

11. The liquid crystal display of claim 1, wherein the protrusion is provided in at least one place of a top end of at least one branch electrode of the plurality of branch electrodes, a right lower end of a branch electrode of the plurality of branch electrodes, and one corner of a contact portion where the pixel electrode contacts the drain electrode.

12. The liquid crystal display of claim 1, wherein liquid crystals in an area where the protrusion is provided are arranged in a direction which is the same as the direction in which liquid crystals of a peripheral area are arranged.

13. A liquid crystal display comprising:
a first substrate;
gate lines disposed on the first substrate;
a gate insulating layer disposed on the gate lines;
a semiconductor layer disposed on the gate insulating layer;
data lines and a drain electrode disposed on the semiconductor layer;

a passivation layer which covers the data lines and the drain electrode and in which a contact hole which partially exposes the drain electrode is defined;

a common electrode provided above the passivation layer;

a pixel electrode which is electrically connected with the drain electrode through the contact hole, overlapped with the common electrode, and comprises:

a plurality of branch electrodes connected to each other in a connection portion at lower portions thereof and separated from each other at upper portions thereof, thereby providing a fork shape, a contact portion which is extended from the connection portion, and electrically connected with the drain electrode through the contact hole, and a protrusion which protrudes toward a neighboring pixel of the plurality of branch electrodes, and is provided in an end of at least one of the connection portion, an upper portion of a branch electrode of the plurality of branch electrodes, and the contact portion of the pixel electrode; and a second substrate corresponding to the first substrate, wherein, in a whole area of the protrusion, a width of the protrusion is gradually decreased toward an end thereof such that the protrusion has first and second end sides which respectively extend in directions different from a length extension direction of the protrusion.

14. The liquid crystal display of claim 13, wherein the protrusion is provided in at least one place of a top end of at least one branch electrode of the plurality of branch electrodes, a right lower end of a branch electrode of the plurality of branch electrodes, and one corner of a contact area where the pixel electrode contacts the drain electrode.

15. The liquid crystal display of claim 14, wherein the protrusion and the gate lines define an angle of about 0 degree to about 90 degrees.

* * * * *